(12) United States Patent
Sandhu

(10) Patent No.: US 9,671,277 B2
(45) Date of Patent: Jun. 6, 2017

(54) LIGHT IMAGING SYSTEM FOR AN ACOUSTIC IMAGING SYSTEM

(71) Applicant: Jaswinder Singh Sandhu, Buffalo Grove, IL (US)

(72) Inventor: Jaswinder Singh Sandhu, Buffalo Grove, IL (US)

( * ) Notice: Subject to any disclaimer, the term of this patent is extended or adjusted under 35 U.S.C. 154(b) by 82 days.

(21) Appl. No.: 14/602,406

(22) Filed: Jan. 22, 2015

(65) Prior Publication Data

US 2016/0216151 A1    Jul. 28, 2016

(51) Int. Cl.
*G01J 4/00* (2006.01)
*G01H 9/00* (2006.01)

(52) U.S. Cl.
CPC .................... *G01H 9/002* (2013.01)

(58) Field of Classification Search
CPC ........................................................ G01J 4/00
USPC .......................................................... 356/365
See application file for complete search history.

(56) References Cited

U.S. PATENT DOCUMENTS

| | | | | |
|---|---|---|---|---|
| 4,492,107 A | * | 1/1985 | Sandhu | G01H 9/002 349/199 |
| 4,506,550 A | * | 3/1985 | Sandhu | G01H 9/002 349/177 |
| 6,049,411 A | * | 4/2000 | Sandhu | G01H 9/002 356/364 |
| 6,321,023 B1 | * | 11/2001 | Wang | G02F 1/116 359/205.1 |

* cited by examiner

*Primary Examiner* — Roy M Punnoose

(57) ABSTRACT

A light imaging system for an acoustic imaging system uses polarized light to illuminate a birefringent detector through a partially transparent mirror, a lens through which light reflected from the detector passes and a light imager views the mirror through a linear polarizer with the position of the light imager being adjusted to image the full detector and to minimize effects due to the non-linear behavior of the detector.

1 Claim, 1 Drawing Sheet

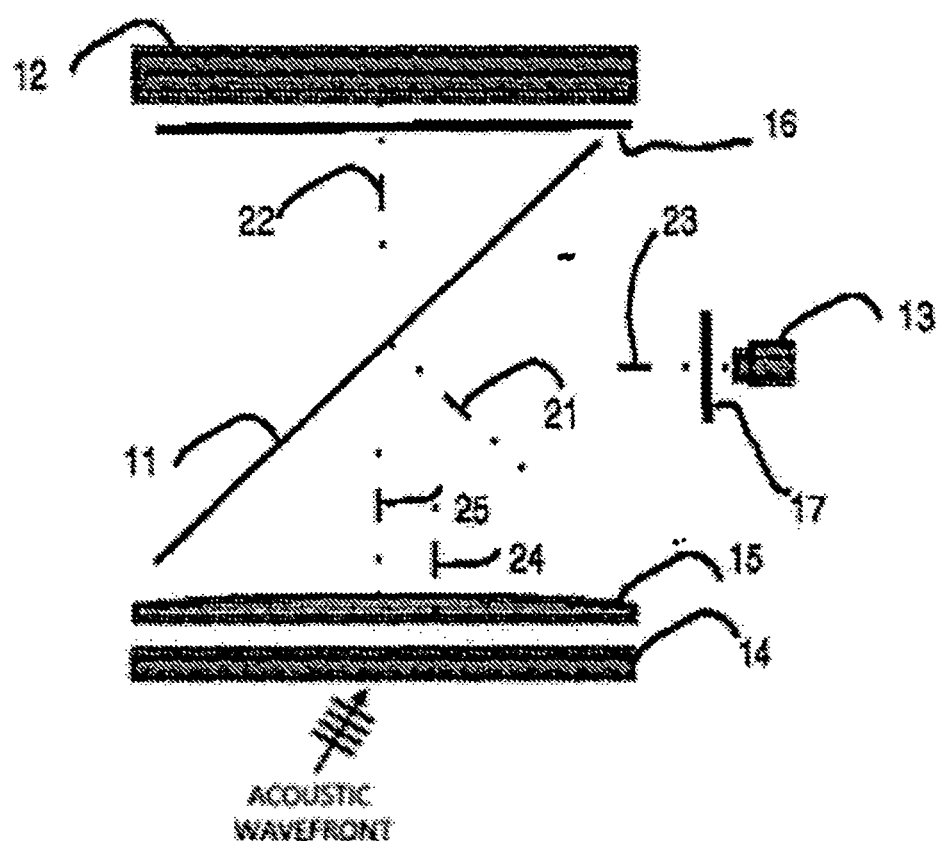

LIGHT IMAGING SYSTEM FOR AN ACOUSTIC IMAGING SYSTEM

SUMMARY

It is a new result and unexpected discovery that the optimum angle condition of U.S. Pat. No. 6,049,411 can also be obtained using a partially transparent mirror between the birefringent detector and the light source and configuring together an angle between an imager and the mirror and a distance between the imager and the mirror.

BRIEF DESCRIPTION OF THE DRAWINGS

FIG. 1 shows elements of the light imaging system. The light source 12 and the detector 14 can be interchanged.

DETAILED DESCRIPTION

A light imaging system using a partially transparent mirror between the birefringent detector and the light source and configuring together an angle between an imager and the mirror and a distance between the imager and the mirror obtains the conditions described in column 3 line 42 to column 4 line 16 and elsewhere in U.S. Pat. No. 6,049,411. Various examples of birefringent detector acoustic imaging systems and of the several key subsystems—the acoustic source, the birefringent detector, the optical imager, and the data processor—which comprise birefringent detector acoustic imaging systems have been described in prior art disclosed above. Prior art birefringent detector acoustic imaging systems however have not been able to produce useful images at an acceptable cost in time and money. The invention shown here improves the optical imager and does produce useful images at an acceptable cost in time and money.

The discovery underlying this invention is the discovery of a large gain in sensitivity of the birefringent detector acoustic imaging system which is possible by having all of the rays of light energy incident on the birefringent detector be at the same predetermined optimum angle relative to the normal axis of the birefringent detector. The optimum angle depends in complicated ways on various specific details of the birefringent detector chosen for the intended uses of the birefringent detector acoustic imaging systems and there are many variations in birefringent detectors optimized for various uses. Thus, it was thought that the cost of predetermining the optimum angle and configuring a system using this predetermined optimum angle would not produce enough benefit to justify the increase in the cost of an optical imager.

It had been common practice to use incident light which is not collimated with the central ray parallel to the normal axis of a birefringent detector. When the central ray was moved to a non-zero angle relative to the normal axis of the birefringent detector in order to reduce the complexity of the optical system, then unwanted reflection polarization effects were seen. When an optical system was reconfigured to use collimated incident light in order to control these reflection polarization effects, then it was discovered that the angle of the incident light relative to the normal axis of the birefringent detector could be easily optimized experimentally. The unexpected ease of predetermining the optimum angle and the unexpectedly large increase in usefulness of the image yielded a birefringent detector acoustic imaging system which produces the long sought useful images with a reduction in the cost of the optical imager.

The new and unexpected light imaging system described and claimed here can replace the light imaging system of FIG. 2 in U.S. Pat. No. 6,049,411 which has been incorporated in full herein by reference.

The new light imaging system comprises:
a birefringent detector 14 in acoustic wavefront imaging,
a detector axis 24;
a light source 12 providing incident light which illuminates the birefringent detector;
a light axis 22;
a first linear or circular polarizer 16 between the light source and the detector;
a lens 15 through which incident light reflected by the detector passes;
a lens axis 25 of the lens;
a focal plane of the lens;
a partially transparent mirror 11 between the birefringent detector and the light source,
a mirror axis 21;
a light imager 13 viewing the mirror;
an imager axis 23;
a second linear or circular polarizer 17 between the detector and the imager;
an imager angle between the imager axis and the mirror axis;
an imager distance between the imaging plane and the reflecting plane;
a mirror angle between the mirror axis and the detector axis;
a light angle between the light axis and the detector axis;
a lens angle between the lens axis and the detector axis.

The birefringent detector and the acoustic imaging system are described in U.S. Pat. No. 6,049,411 which has been incorporated herein in full herein by reference.

Illuminating the birefringent detector is described in U.S. Pat. No. 6,049,411 which has been incorporated herein in full herein by reference.

Imaging light reflected by the birefringent detector is described in U.S. Pat. No. 6,049,411 which has been incorporated herein in full herein by reference.

When the axis of polarization of the second polarizer is orthogonal to the axis of polarization of the first polarizer, then black portions of an image formed by the imager correspond to portions of the detector which do not change the polarization of incident light. In this configuration less black portions of an image formed by the imager correspond to portions of the detector which have changed the polarization of incident light.

In an example, the birefringent detector 14 is a three inch by three inch model made by Santec Systems. A five inch by five inch Fresnel lens 15 with a seven inch focal length is just above the detector.

In the example, above the lens is a partially transparent mirror 11 with forty five degrees between the mirror axis 21 and the Detector axis 24. The mirror is large enough so that the imager can view the entire reflecting plane of the detector.

In the example, above the mirror is the light source 12 (LED Edge-Lit Panel, size 3.75"×3.75", supplied by Knema Solid State Lighting) with the light axis 22 parallel to the detector axis 24. Just below the light source is a linear or circular polarizer 16 (AP42-007T from American Polarizers, Inc.).

In the example, the imager 13 (Model A311fc, from Basler Corporation) views the mirror. The lens distance, the imager distance, and the imager angle are adjusted together to view the full surface of the detector and to minimize effects due to the non-linear behavior of the detector.

Because of variations in the parts of the example configuration together of the lens distance, the imager distance, and the imager angle must be accomplished by experiment.

What is claimed is:

1. A light imaging system for an acoustic imaging system, the light imaging system comprising:

a birefringent detector that receives the acoustic wavefront; a light source which illuminates the birefringent detector through a first polarizer, a partially transparent mirror and a lens, said first polarizer positioned between said light source and said partially transparent mirror and said lens positioned between the partially transparent mirror and said birefringent detector, said partially transparent mirror angularly aligned to transmit through the light from the light source to said lens and to said birefringent detector, and to direct reflected light from said birefringent detector through said lens and through a second polarizer to a light imager.

* * * * *